Oct. 22, 1940. O. B. MORGAN 2,218,765
FOLDABLE SCREEN ENCLOSURE FOR BED FRAMES
Filed Aug. 29, 1939 3 Sheets-Sheet 1
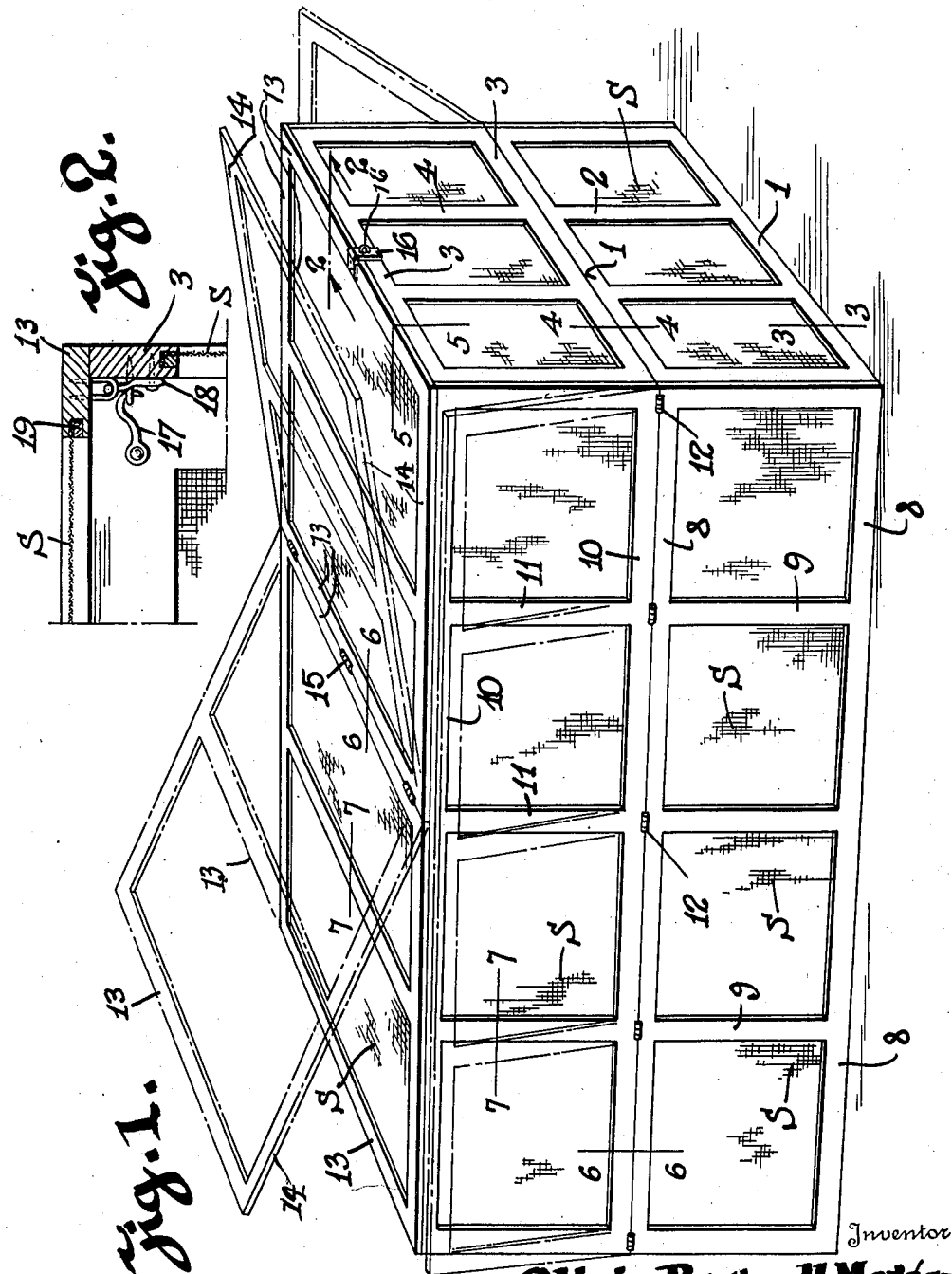
Inventor
Olivia Burwell Morgan
By Lester L. Sargent
Attorney

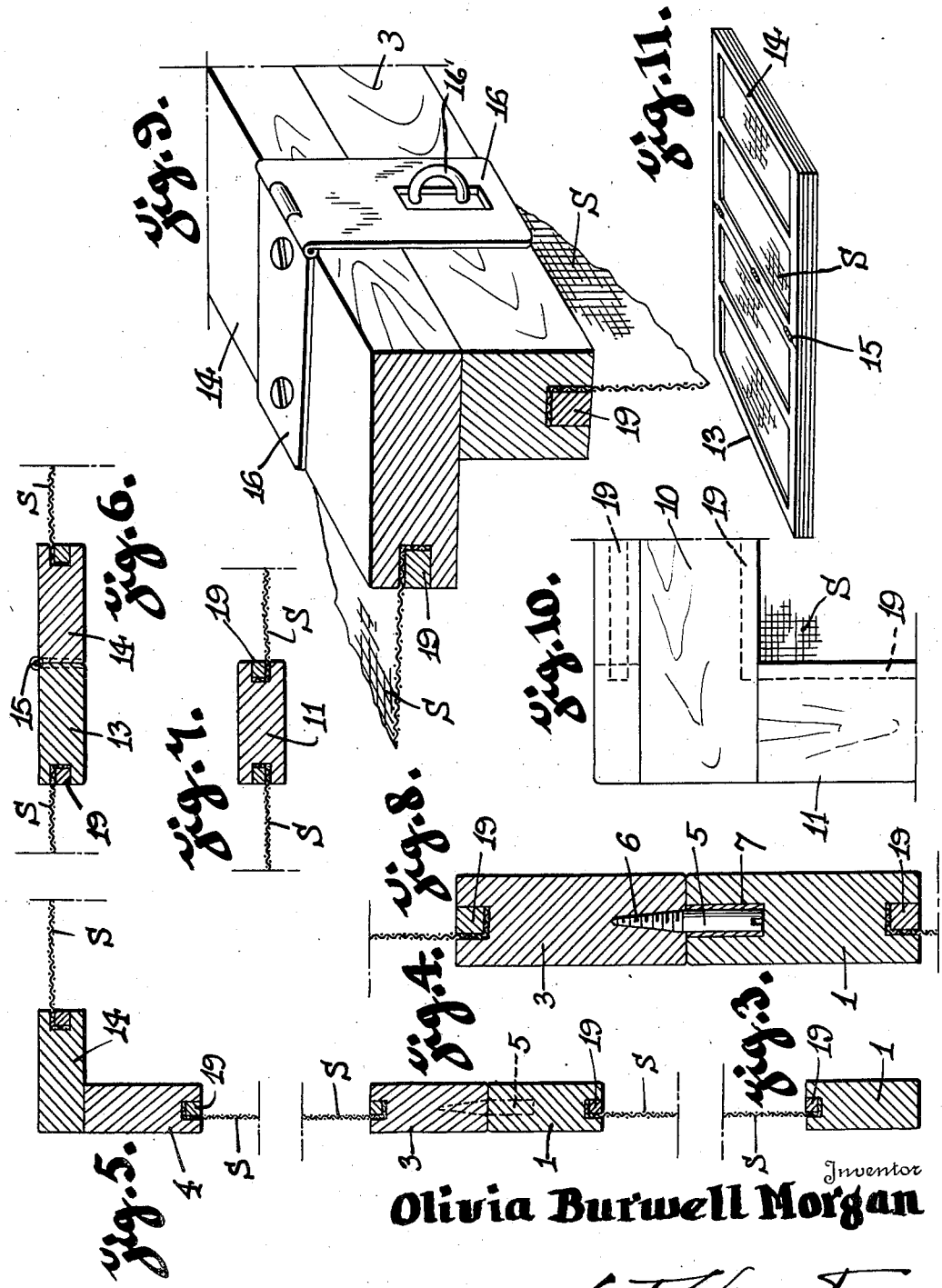

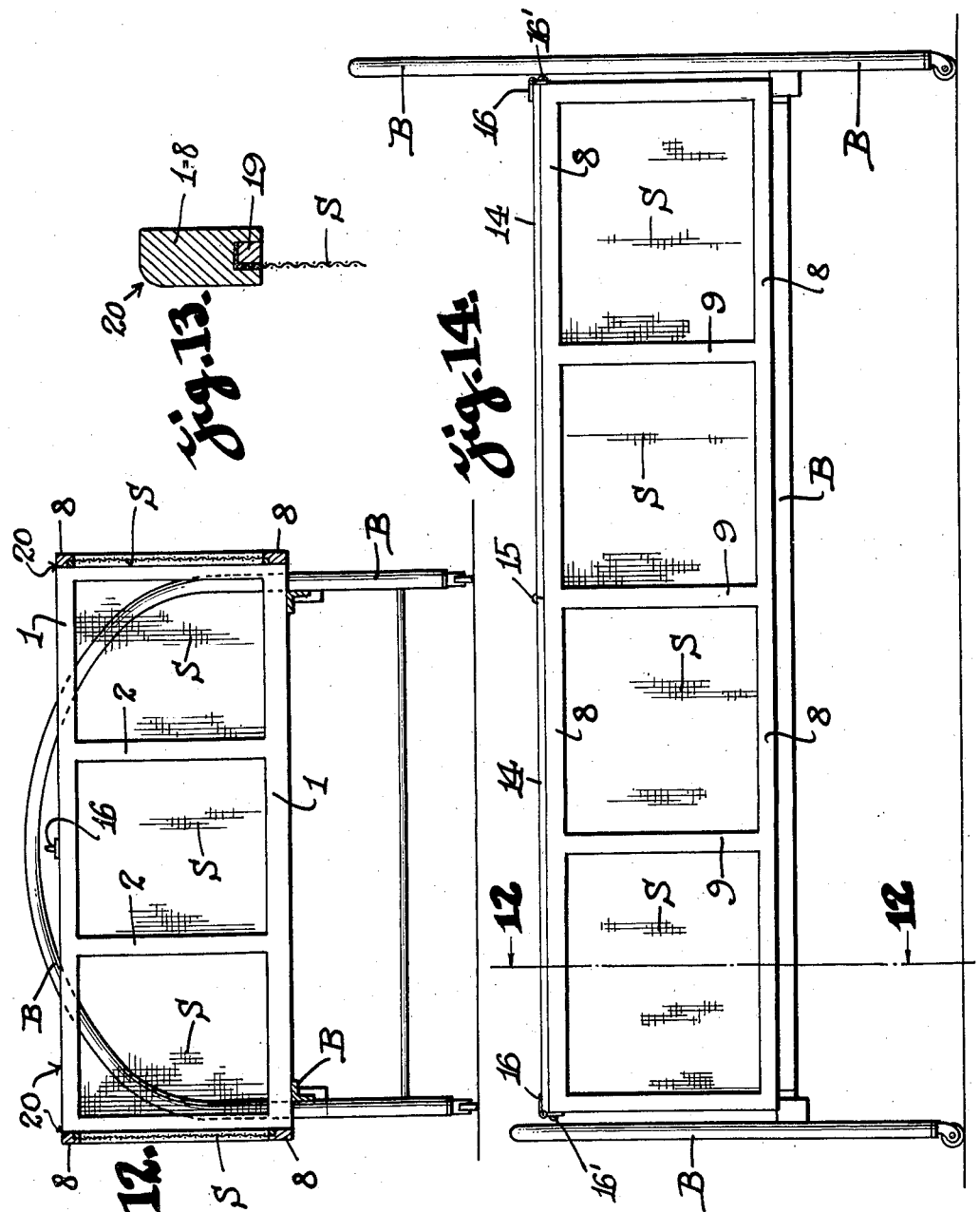

Patented Oct. 22, 1940

2,218,765

UNITED STATES PATENT OFFICE 2,218,765

FOLDABLE SCREEN ENCLOSURE FOR BED FRAMES

Olivia Burwell Morgan, Phoenix, Ariz.

Application August 29, 1939, Serial No. 292,489

4 Claims. (Cl. 135—5.1)

The object of my invention is to provide a screen covering or cage which may be placed over a bed frame to protect either children or adults while sleeping out of doors, from insects and animals. It is an especial object of my invention to provide an enclosure suitable for caring for small children, which may be mounted on a conventional single bed frame such as is illustrated in Figs. 12 and 14 of the drawings and which is supported within and can be mounted on and fits a conventional bed frame, as shown. It is also an especial object of my invention to provide an enclosure or bed pen of this type which has rounded corners such as the corners 20 shown in Fig. 13 of the drawings and which will prevent a small child from getting injured while playing about the pen. It is a further object of my invention to provide a screened enclosure or pen made in two hingedly connected sections, such as shown in Fig. 1, whereby the device may be quickly converted from a completely enclosed pen to a partially enclosed pen of less height or which may have the wall on one side only lowered.

It is also an object of my invention to provide such a covering or enclosure which may also be used as a play-pen for small children. It is a further object of my invention to provide a device that will be useful around sanitariums and health resorts both as a protection from insects and also for use in ameliorating the strength of the direct rays of the sun in sun-bathing practices.

It is also an object of my invention to provide a device of this character which may be readily assembled and dissembled and when dissembled may be compactly packed for shipping or storage purposes.

It is also an object of my invention to provide a modified form of the device, adapted to rest on a bed and retain a child on the bed while sleeping or resting and prevent his rolling off the bed.

I attain the objects of my invention by the mechanism illustrated in the accompanying drawings, in which—

Figure 1 is a perspective view of the invention; with the top and sides shown in a partly open position by dot and dash lines;

Fig. 2 is a detail sectional view on line 2—2 of Fig. 1;

Fig. 3 is a typical section on line 3—3 of Fig. 1;
Fig. 4 is a typical section on line 4—4 of Fig. 1;
Fig. 5 is a typical section on line 5—5 of Fig. 1;
Fig. 6 is a typical section on line 6—6 of Fig. 1;
Fig. 7 is a typical section on line 7—7 of Fig. 1;
Fig. 8 is a vertical section somewhat enlarged, similar to Fig. 4 but showing the screw 5 in side elevation;

Fig. 9 is an enlarged section on a plane corresponding with line 5—5 of Fig. 1 and showing the hasp in perspective;

Fig. 10 is a detail plan view of a corner portion of members 10 and 11;

Fig. 11 is a perspective view of the device in dissembled form, packed for shipment or storage;

Fig. 12 is a transverse section through the modified form of the invention on line 12—12 of Fig. 14, showing the device as a pen mounted on a bed to prevent a young child from rolling off while sleeping;

Fig. 13 is an enlarged detailed section through one of the top rails 1 or 8, showing the curved inner edge of the rail; and Fig. 14 is a side elevation of the modified form of the invention shown in Fig. 12, mounted on the bed.

Like characters of reference designate like parts in each of the several views.

Referring to the accompanying drawings, I provide lower end panel or frame consisting of a pair of spaced horizontal end rails 1 and a plurality of vertical rails 2; and an upper end panel consisting of similar spaced horizontal end rails 3 and a plurality of vertical rails 4.

In order to hold the upper and lower panels in vertically aligned position, the rails 1 and 3 are detachably secured together by headless screws which have their screw-threaded portion 6 screw-threaded into the member 3 and their cylindrical body portion 5 removably seated in a socket or sleeve 7 mounted in the upper portion of rail 1, as shown in Fig. 8. The other end of the device is constructed with similar panels to those shown in Fig. 1 of the drawings.

The sides of the enclosure comprise a lower side panel having a pair of spaced horizontal rails 8 and a series of vertical rails 9, and an upper panel comprising a pair of spaced horizontal rails 10, and a series of vertical rails 11. The adjacent side rails 8 of the lower panel and 10 of the upper panel are hingedly connected by hinges 12, as shown in Fig. 1. The other side of the device is constructed with similar panels.

The top of the enclosure comprises a pair of like top panels, each of which is formed of a pair of spaced side rails 14 and a plurality of transverse connecting rails 13. The pairs of top panels are hingedly connected by the hinges 15, as shown in Fig. 1.

The top panel 1 may be secured to the adjacent end panel by a suitable hasp 16, as shown in Figs. 1 and 9, affixed to the end rails 13 and engaging a suitable fastening element on the rails 3 of the upper end panels 16'. The top panel is secured from within by means of the hook 17 at each corner, which secures each side of the panel to the end rails 3 of the end panels by the hooks 18.

Screen wire S extends between each of the rails and is secured to them by anchoring strips 19 which engage the end portion of the screen and frictionally hold the screen wire in place in the manner illustrated in Figs. 2 to 9 inclusive of the drawings.

The side and end members of the lower section of the device may be detachably fastened together in any suitable manner as by wood screws (not shown). The upper end panels are detachably secured to the lower end panels by the headless metal screws 5, embedded in the sleeve 7, mounted in the upper end portion of the lower panels, in the manner illustrated in Fig. 8 of the drawings. The upper side panels are held in their normal vertical position by means of conventional small metal hasps 17, which may either be set upon the surface of the boards or may be inset to present a flush surface.

The lower rails of the upper panels are hinged to the top rails of the lower side panels so that when the hasps 17 are unhooked, the upper side panels will open outward, as illustrated in dotted lines in Fig. 1 and may be dropped down parallel with the lower side panels.

The cover of the enclosure is made of two like hinged panels of equal size hinged together, as shown in Fig. 1, to form a complete top cover for the enclosure. The top covering is made of the same material as the other sections. This cover may rest loosely on the enclosure or may be securely fastened at both ends by means of hasps 17 and 16. This cover also may be removed easily by lifting at each end and folding in the center.

When the cover is in place on the enclosure, either panel of the cover may be lifted and laid back over the other panel without lifting the cover off of the enclosure, as the two half portions of the cover are connected by the hinges 15. By providing the hasps 17 within the device, a person within the device may fasten the side panels in a vertical locked position. Such hasps 17 may be placed at each of the four corners of the upper section.

As all of the panels are of uniform size, the device can be collapsed into a compact bundle for shipment or for storage purposes, as illustrated in Fig. 11 of the drawings. The size of the device which is preferred is 39 inches in width and 39 inches high, which height will permit a small child to play inside the enclosure when used as a play pen. When used as a play-pen for a larger child that would be able to crawl out of the device, the top cover may be fastened by the hasps 16 at each end.

Figs. 12 to 14 illustrate a modification of my invention used on a bed as an enclosure to prevent a child from rolling off. It is of identical construction to the lower section of the form shown in Fig. 1, heretofore described in detail, except that the hinges 12 are omitted and the hasp eyes 16' are applied to the end rails 1, as shown in Fig. 14. It may be provided with a removable cover 14, as shown in Fig. 14; or this cover may be omitted as in Fig. 12. This frame is mounted on the bed B, as shown in Figs. 12 and 14; its end screen panels being of slightly greater width than the width of the bed, and the side screen panels extend adjacent the sides of the bed, as shown in Figs. 12 and 14, and of sufficient size to enclose the springs of the bed.

The upper rails 1 and 8 are preferably provided with an inner upper curved edge 20, such as shown in Fig. 13.

It is contemplated that the bed frame, as shown in Figs. 12 and 14 may be sold independently of the remainder of the device, and that the purchaser need not purchase the entire device in order to obtain the lower bed frame for use as a pen if the lower frame is all that he desires.

It is also contemplated that the bed frame shown in Figs. 12 and 14 may be sold either with or without the cover, and that the entire device, as shown in Fig. 1, may be purchased if desired without the cover.

What I claim is:

1. In a foldable screen enclosure adapted to be removably mounted in a conventional bed frame, for bed frames, the combination of pairs of vertically aligned separable end panels, means for detachably securing the upper panel and lower panel of the end panels to each other, pairs of vertically aligned side panels, the upper side panels being hingedly connected to the lower side panels, and means positioned within the panels for releasably securing the side panels to the end panels.

2. In a foldable screen enclosure adapted to be removably mounted on a conventional bed frame, the combination of pairs of vertically aligned detachable end screen panels, means for detachably mounting the upper screen panel on the lower screen panel of each of said pairs of end screen panels, said means including sleeves mounted in the upper frame member of the lower panels, headless screws mounted in the lower frame members of the upper panels and loosely seating in the aforesaid sleeves, pairs of side screen panels, each of the upper side screen panels being hingedly connected to the lower side panels, and means positioned within the panels for releasably securing the side panels to the end panels.

3. In a foldable screen enclosure for bed frames, the combination of pairs of vertically aligned end screen panels, interlocking means for detachably securing the upper screen end panel to the lower screen end panel, pairs of side screen panels, each of the upper side screen panels being hingedly connected to the lower side screen panels, transversely hinged removable top screen panels of suitable size to complete the enclosure, means accessible only to a person within the enclosure for releasably securing the upper side panels to the end panels, and means positioned within the panels for releasably securing the side panels to the end panels.

4. In a foldable screen enclosure for bed frames, the combination of pairs of vertically aligned end screen panels, means for detachably securing the upper screen panel and lower screen panel to each other, pairs of side screen panels, each of the upper side screen panels being hingedly connected to the corresponding lower side panel, removable top screen panels of suitable size to complete the enclosure, means accessible only to a person within the enclosure for releasably securing the upper side panels to the end panels, the upper side panels being foldable downward to overlie the lower side panels, and means accessible only to a person within the enclosure for releasably securing the top panels to the end panels, said top panels being transversely hinged and foldable.

OLIVIA BURWELL MORGAN.